United States Patent

[11] 3,585,478

[72] Inventor Albert C. Leenhouts
        Harwinton, Conn.
[21] Appl. No. 5,197
[22] Filed Jan. 23, 1970
[45] Patented June 15, 1971
[73] Assignee The Superior Electric Company
        Bristol, Conn.

[54] METHOD AND APPARATUS FOR DIGITAL CONTOURING USING STEPPING MOTORS WITH CLOSE APPROXIMATION OF DESIRED PATH
12 Claims, 5 Drawing Figs.

[52] U.S. Cl. .................................................. 318/573,
        318/574, 318/685, 318/696
[51] Int. Cl. .................................................. G05b 19/24,
        G05b 19/40
[50] Field of Search .......................................... 318/573,
        574, 685, 696

[56] References Cited
UNITED STATES PATENTS
3,416,056 12/1968 Motooka et al. ............... 318/573
3,461,365 8/1969 Nowland et al. ............... 318/685 X
3,525,917 8/1970 Leenhouts ...................... 318/574 X Primary Examiner—T. E. Lynch
Attorney—Johnson & Kline ABSTRACT: A method and apparatus for producing relative movement of an element along two perpendicular axes to closely approximate a desired path with the movement consisting of sequential steps. The desired path may be straight or arcuate while the actual movement or path consists of steps along just the axes. The maximum error of the actual path from the desired path is caused to be less than the length of one step by having both simulated steps and actual steps, determining for each step before taking the step the position of the element with respect to the desired path, taking the next step on the axis which tends to cause the step to cross the desired path but only making the actual steps on each axis effect movement of the element on that axes with the actual steps alternating with simulated steps on the axis.

INVENTOR
Albert C. Leenhouts
BY
Johnson and Kline
ATTORNEYS

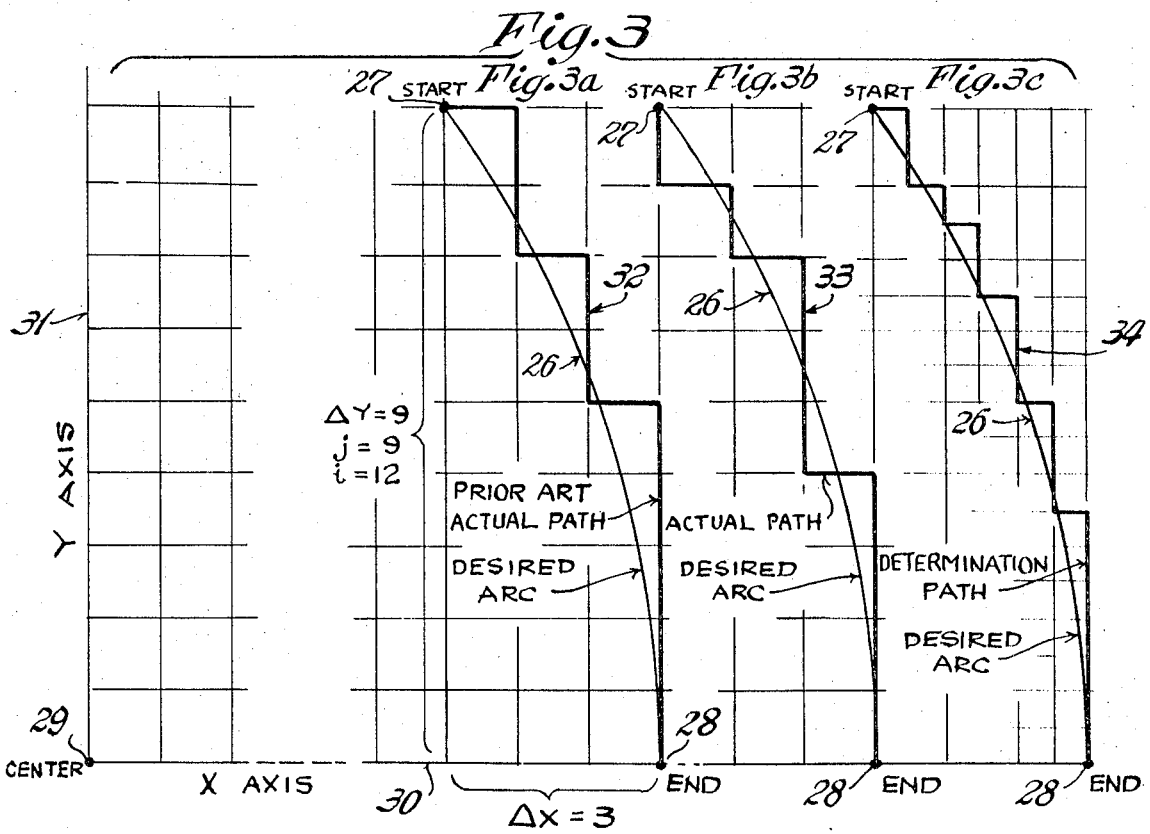
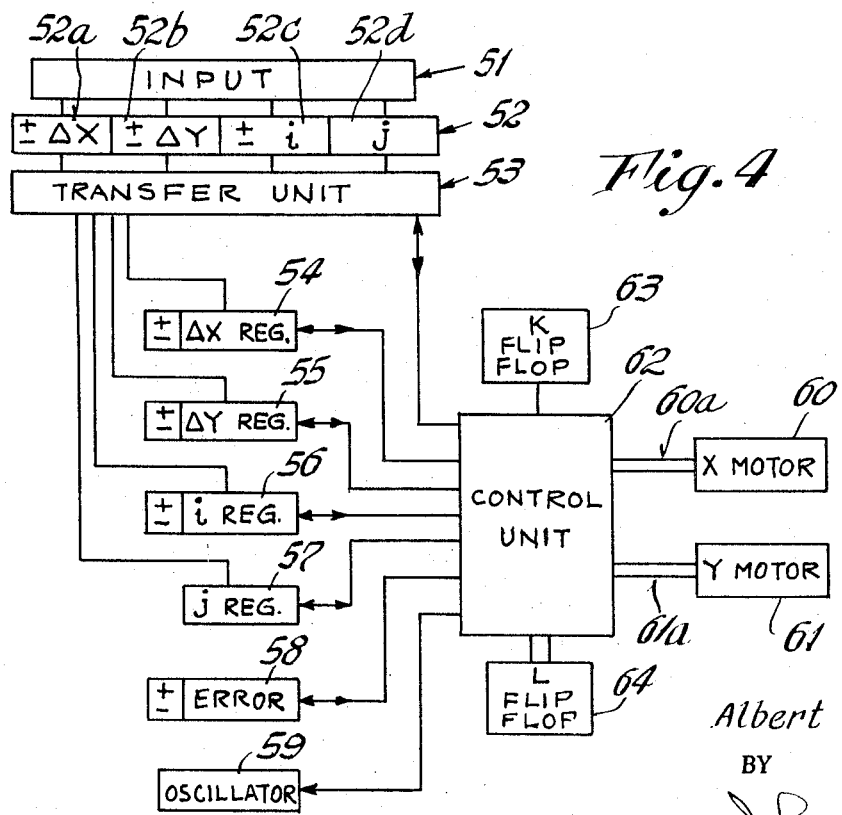

METHOD AND APPARATUS FOR DIGITAL CONTOURING USING STEPPING MOTORS WITH CLOSE APPROXIMATION OF DESIRED PATH

The present invention relates to causing an element such as a machine tool bed or tool to move substantially along a path that is prescribed by programmed instructions with the movement being automatically carried out by a numerical control system. One type of such a system is known as a digital system and the movement consists of increments of movement or steps along two axes perpendicular to each other with the programmed instructions consisting of the number of increments of movement required along each axis to move the element from the start to the end of the path.

In U.S. Pat. No. 3,466,515, assigned to the assignee of the present invention, there is disclosed a numerical control system of the digital type which utilizes increments of movement and which causes the movement to start at a selected point and terminate at a selected point according to programmed instructions. However, the actual path between the two points is not controlled. In another of my copending applications Ser. No. 718,725, now U.S. Pat. No. 3,525,917, also assigned to the assignee of the present invention, there is disclosed a method and apparatus for causing an element to relatively move along the actual path from the start to the end by using increments of movement on one or the other of two perpendicular axes. The steps or increment of movement is each taken sequentially (not simultaneously) and may be on one axis or the other with the determination of on which axis a step is to be taken being effected by considering the actual position of the tool with respect to the desired path prior to taking each step.

Each step when taken on an axis produces an error from the desired path and the determination consists of maintaining an algebraic count of the error introduced by each step so that after each step, the system has information as to the amount and direction of the deviation of the actual position of the element from the desired path. The latter information is based on the algebraic sign of the deviation with one axis producing a positive deviation and the other axis producing a negative deviation and the system utilizes the algebraic sign to cause the next increment of movement to be taken on the axis which would reduce the extent of deviation. Thus, whenever the deviation is, for example, +, an X step is taken while whenever the deviation caused by the prior steps is − a Y increment is taken. In this way the system causes the actual path to cross the desired path whenever possible and thus maintains the deviation to a maximum that is not greater than the length of movement produced by one increment of movement.

While such a system has been found exceedingly satisfactory, in some situations, a maximum deviation of one increment of movement may be beyond tolerable limits even though each increment of movement may be on the order of only 0.001 or 0.0005. Moreover, especially in the traversing of an arc where the deviation consists of a number that is changing a multiple of the input information, the system has tended to be rendered somewhat complex by the requirement of generating such a number.

It is accordingly an object of the present invention to provide a numerical control contour system for producing movement on two perpendicular axes in which the movement consists of increments and in which the maximum deviation of the movement from the desired path is less than the length of an increment.

Another object of the present invention is to achieve the above object with only minor changes and/or additions in presently existing numerical control contour systems.

A further object of the present invention is to provide a numerically controlled system for substantially following a desired path, either straight or arcuate which even though capable of preciseness and accuracy is relatively simple in construction, economical to manufacture and durable and reliable in use.

The present invention is essentially similar and has substantially all the components disclosed in my above-noted application Ser. No. 718,725. However, rather than having the maximum deviation be equal to one increment of movement, the maximum deviation of the herein disclosed system is limited to $1/\sqrt{2}$ or 0.707 of an increment of movement. Thus though both systems will utilize the same input information and have essentially the same components the present system enables the maximum possible deviation of the actual path from the desired path be reduced approximately 30 percent.

My prior system utilized the concept of attempting to make the actual path cross the desired path as many times as possible while traversing the path. Coincidence of the desired path and actual path results in the event of the error register being 0 and a crossing causes the count of the error register to change its algebraic sign. Thus whenever the algebraic sign of the deviation changed with the taking of a step on one axis, the next step is taken on the other axis.

The present system utilizes the same error register for maintaining a count of the deviation and also the algebraic sign indicative of in which direction the deviation exists. However, in the present numerical contour control system there is, in addition to actual increments, increments which are called simulated increments. For each increment irrespective of whether or not it is an actual increment or a simulated increment, the system determines on which axis the next increment is to occur in a manner as in my prior system, namely, by noting whether the prior increment would have caused a crossing of the desired path as determined by the change in sign of the error register. It then directs in the same manner as the above-noted system, the next increment to the axis which has been determined would produce the crossing of the paths. However, at each axis, each simulated pulse is inhibited from preventing an actual movement while the actual increments are permitted to pass and effect a movement of the element.

Specifically, every other increment received by an axis is an actual increment so that only one-half of the increments received by an axis results in a physical movement of the element. But, within the system, except for the movement and the counting of actual movements, a simulated increment functions the same as an actual increment.

The effect of using simulated pulses together with actual pulses would initially appear merely to double the number of determinations made as to the position of the actual path with respect to the desired path. However, this is not exactly correct since for both movements the deviation utilized in the determination is the deviation produced by an actual step not a half step. Thus the use of simulated increments actually tends to cause the system to determine next the deviation which the next step would produce but also the deviation which the second next step would introduce as error and forces the system to make movement on the axis for every other increment. The resulting maximum error is accordingly the altitude of a right isosceles triangle having the length of an actual increment as its sides or numerically 0.707 of the length of an increment.

Other features and advantages will hereinafter appear.

In the drawing:

FIG. 1 is a diagrammatic representation of the numerical control system showing an element interrelated with a movable machine bed and a fixed working tool.

FIG. 2 consists of three illustrations with each having a desired linear path and with FIG. 2a depicting a prior art actual path, FIG. 2b an actual path according to the present system and FIG. 2c the determination path.

FIG. 3 consists of three illustrations similar to FIG. 2 showing the three paths with respect to an arcuate desired path.

FIG. 4 is a block diagram of the system of the present invention.

Figure 1:
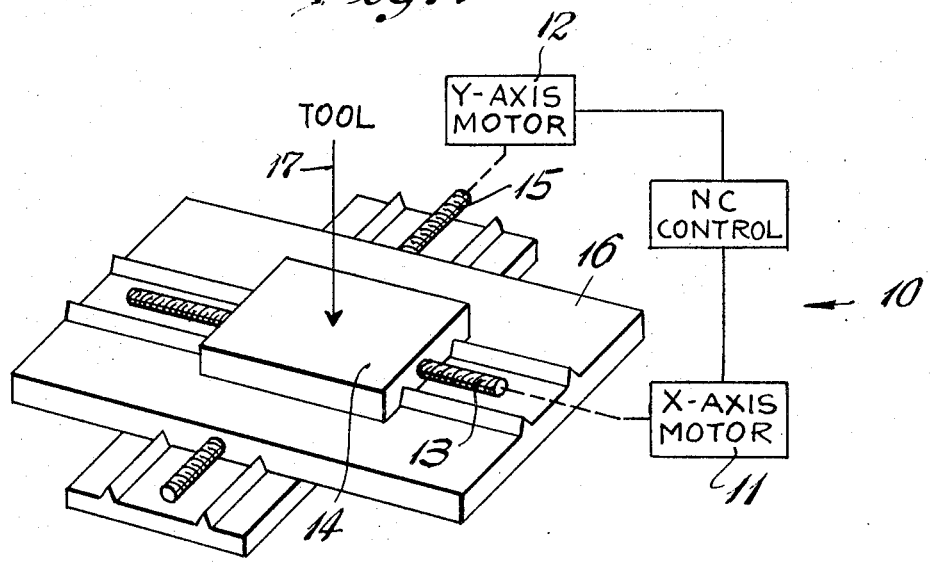

Referring to the drawing, the numerical control contour system of the present invention is generally indicated by the reference numeral 10 and includes an X-axis motor 11 and a Y-axis motor 12. The X-axis motor 11 is diagrammatically shown connected to a screw 13 of a movable machine bed 14 while the Y-axis motor is connected to another screw 15 that drives the X-axis carriage 16. It will be understood that rotation of either motor 11 or 12 will cause the bed 14 to move with respect to a stationary tool 17 and that the axes of the two motors are perpendicular to each other. Moreover, while the system has been shown as being connected to a machine tool bed it will be understood that it may be connected to other and different apparatus as, for example, the tool with the bed being maintained stationary.

Both of the motors 11 and 12 are of the reversible, stepping type in that each will move a constant arc for each change of energization received thereby and the motors are connected to the bed to produce a constant length of linear movement for each change of energization with the lengths or increments of movements being the same on both axes. One type of motor which may be employed is a "SLO-SYN" stepping motor manufactured by the assignee of the present invention.

As a specific example a motor may have 200 increments of movement for each rotation and if the screws 13 and 15 are each 5 pitch, each movement of a motor will produce 0.001 inch of movement of the bed.

Figure 2:
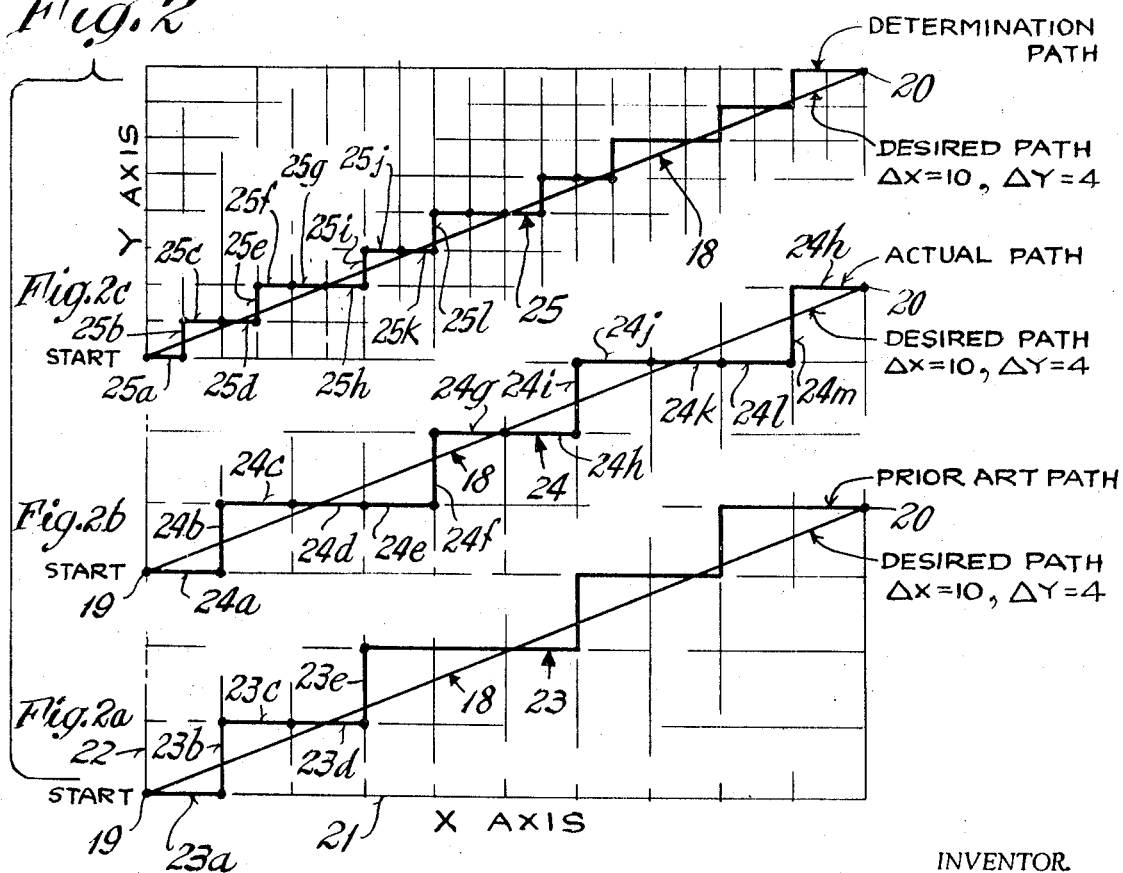

Shown in each of the three illustrations forming FIG. 2 is a desired path consisting of a straight line 18 which has a start 19 and an end 20. The bed is desired to be moved along this path with respect to an X-axis 21 and a Y-axis 22. This path has its end 20 located a distance of 10 X increments ($\Delta X$) and a distance of four Y increments ($\Delta Y$) from the start. The system of my above-noted copending application produces the stepped actual path 23 by having increments of movement along the X and Y axes with the first increment 23a being an X increment, then a Y increment 23b, an X increment 23c and so forth.

In FIG. 2b the X and Y axes are indicated together with the line 18, its start 19 and its end 20. The system of the present invention produces the step of this actual path 24 which includes from the start an X increment 24a, then a Y increment 24b, then an X increment 24c with two following X increments 24d and 24e followed by a Y increment 24f then two X increments 24g and 24h followed by a Y increment 24i with subsequently three X increments 24j, 24k and 24l being followed by a Y increment 24m and a terminating X increment 24n.

A comparison of the two paths 23 and 24 discloses the path 24 has a lesser maximum deviation from the desired path 18 than the prior art path 23. Especially, the large deviation introduced by the increment 23e being taken along the Y-axis in the prior art path 23 which is not present in the actual path 24 of the present system.

As described in my above-noted copending application, the prior art path 23 is formed by first taking an X increment (23a), then a Y increment (23b) is taken. The system then determines if the last increment terminated at a position which is above the line 18 or below the line 18. If it is the former then the next increment is taken on the X-axis while if the latter, the increment is taken on the Y-axis. As the increment 23b terminates above the line 18, an X increment 23c occurs which also terminates above line 18 and hence is followed by another X increment 23d. This causes the actual path 23 to cross the desired path 18. The end of the increment 23d is located below the line 18 which makes the system produce the next increment 23e on the Y-axis. Thus the system will determine on which axis the next increment is to occur by considering where the actual path is in relation to the desired path at the end of the previous increment.

The present system utilizes the same determination for directing on which axis the next increment will occur. However, the system not only determines the position after each actual increment but also determines the position after each simulated increment. Shown in FIG. 2c is a plot of the determination made by the system of the present invention to produce the actual path 24. As the present system makes twice the number of determinations as in the prior art system shown in FIG. 2a each of the increments is made to have a length that is only one-half of the length of the increments in the line 24 for clarity of explanation. The determination path 25, as in the path 23, has an initial X increment 25a followed by a Y increment 25b, two X increments 25c and 25d and a Y increment 25e. Subsequently there occurs three X increments 25f, 25g and 25h followed by a Y increment 25i. From the increment 25i there are then two X increments, a Y increment and three X increments, etc., to the end 20 of the line 18. By comparing line 25 with line 23 it will be seen that the same sequence of increments occurs.

The present invention produces the path 24 as a result of the determination path 25. The system directs each determination increment to the proper axis but only allows every other increment to produce movement and thus the only alternate increments constitute actual increments while the intermediate increments are simulated increments producing no movement.

The 25determination increment 25a is on the X-axis and is a simulated increment as it is the first increment to the X-axis. The next determination increment 15b is on the Y-axis and is a simulated increment as it also is the first increment on the Y-axis. The increment 25c is an even numbered X increment and this produces, when applied to the motor 11, the increment 24a of the path 24. The increment 25d is the third X increment and hence it is a simulated increment which does not produce motor movement. However, the increment 25e is the second Y-axis increment and this causes the motor to provide the movement indicated by the increment 24b. Similarly the increments 25f and 25h are simulated increments while the increments 25g and 25j are actual increments producing the movements 24c and 24d. The increment 24results from the determination that there should be a simulated increment 25j and an actual increment 25k while the Y actual movement 24f results from the actual increment 25l that occurs after the simulated Y increment 25i. It will thus be seen that even though the determination path follows the conditions for axis selection required for the prior art path 23 that the actual path of the present system is substantially different from the prior art path and produces a deviation which is substantially less than the prior art path.

As set forth in my above-noted application, in the determination of on which axis to take the next increment, the taking of an X increment introduces an error or deviation from the desired path that is equal to $-\Delta Y/\Delta X$ or, for the line 18, $-4/10$. Also, each Y increment produces a deviation which is equal to $\Delta X/\Delta X$ or $10/10$. After the first X increment the deviation is equal to $-\Delta Y/\Delta X$, after the second increment which is a Y increment, the deviation is equal to $(-\Delta Y/\Delta X)+(\Delta X/\Delta X)$, after the third increment an X increment, the deviation is $-\Delta X/\Delta X)+(\Delta X/\Delta X),+(-\Delta Y/\Delta X)$, etc. The deviation at the end of each increment is accordingly the sum of the individual deviations for each of the increments taken. This deviation may be summarized by the equation $$\Sigma D = N\left(\frac{-\Delta Y}{\Delta X}\right) + M\left(\frac{\Delta X}{\Delta X}\right)$$

where $N$ is the number of $X$ increments taken and $M$ is the number of $Y$ increments taken.

If $X$ is not zero (requiring a movement exactly on the Y-axis), the equation may be further reduced by eliminating the denominator $\Delta X$ so that equation becomes $\Sigma D \approx N(-\Delta Y) + M(\Delta X)$. The present method interrogates the sum $\Sigma D$ after each increment to determine whether or not it is zero and if not what is its sign (i.e. $+$ or $-$). By following the above rules of taking an $X$ increment whenever $\Sigma D$ is zero or $+$ and a $Y$ increment when it is $-$, the determination on which axis the next increment will be taken may be made.

In the example given with respect to the determination path of FIG. 2c, where $\Delta X=10$ and $\Delta Y=4$, the following is a numerical tabulation resulting from using the above rules and the interpretation of results of the sign of the formula.

CHART

| X increment | Y increment | ΣD | Next increment |
|---|---|---|---|
| Start | | 0 | X. |
| x | | −4 | Y. |
| | y | +6 | X. |
| X | | +2 | X. |
| x | | −2 | Y. |
| | Y | +8 | X. |
| X | | +4 | X. |
| x | | 0 | X. |
| X | | −4 | Y. |
| | y | +6 | X. |
| x | | +2 | X. |
| X | | −2 | Y. |
| | Y | +8 | X. |
| x | | +4 | X. |
| X | | 0 | X. |
| x | | −4 | Y. |
| | y | +6 | X. |
| X | | +2 | X. |
| x | | −2 | Y. |
| | Y | +8 | X. |
| X | | +4 | X. |
| x | | 0 | X. |
| X | | −4 | Y. |
| | y | +6 | X. |
| x | | +2 | X. |
| X | | −2 | Y. |
| | Y | +8 | X. |
| x | | +4 | X. |
| X | | 0 | End. |

It will be understood that the small letters in the above tabulation under the *X* increment and *Y* increment columns represent simulated increments while the capital letters represent actual increments.

The actual path 24 corresponds to the above by having the following sequential increments *X, Y* 3*X, Y,* 2*X, Y* 3*X, Y,* and a final *X* increment. Though the determination is made for each increment, whether simulated or actual, in the same manner as in the prior art path using the same quantity of deviation for each step, the requirement that only alternate increments on each axis become actual increments of movement causes the actual path 24 to deviate less from the desired path than in the prior systems.

In FIG. 3 there is shown in each illustration a desired path 26 which is an arc of a circle having a start 27 and an end 28. The center of the arc is indicated by the reference numeral 29 and lies at the intersection of an X-axis 30 and a Y-axis 31. The information needed to define the arc utilizes the start 27 as an origin so that $\Delta X$ accordingly =3 and $\Delta Y$=−Moreover, the center 29 is defined from the start along the X-axis by $i=-12$ and $j=9$.

In the prior art actual path 32 shown in FIG. 3*a*, the path consists of the following sequential increments *X,* 2*Y, X,* 2*Y, X* and 5*Y*. This path is determined in the same manner that the prior art path was determined in FIG. 2 by maintaining a count of the total amount of the deviation introduced by each increment and utilizing the algebraic sign of the deviation to select on which axis the next increment is to occur. Whenever the terminous of an increment of movement lies between the center and the arc then an *X* **increment is taken next while if the end of the last increment is further from the center than the desired path, a *Y* increment is taken. However, the actual path 33 of the present system shown in FIG. 3*b* differs from the prior art path by more closely approximating the desired path. The determination path 34 shown in FIG. 3*c* has increments which are made to be one-half the length of the increments in paths 32 and 33 by reason of the inclusion of simulated increments and actual increments. The path 34 is determined according to the following chart.

The determination is based upon the computations that each X step increases the error deviation by an amount of $2i+1$ while each step in the Y direction decreases the error deviation by $2j-1$. If $2i-1$ is subtracted for each X step and $2j-1$ is added for each Y step a total deviation will result which will be either zero, + or −. The value of the quantity is not significant as only the sign is used to indicate the direction of the deviation. Moreover, either *i* or *j* will change with each step by an amount of 1 and hence does not remain constant. It will moreover be understood that 1 may be added or subtracted from either *i* or *j* depending on the direction in which the arc occurs with the present embodiment requiring 1 to be added to 2*i* and 1 to be subtracted from 2*j* for each actual increment of movement.

CHART

| X increment | Y increment | X count | Y count | i count | j count | Error REG | Next increment |
|---|---|---|---|---|---|---|---|
| | | 3 | 9 | 12 | 9 | 0 | X |
| x | | 3 | 9 | 13 | 9 | −12 | Y |
| | y | 3 | 9 | 13 | 8 | −3 | Y |
| | Y | 3 | 8 | 13 | 8 | +5 | X |
| X | | 2 | 8 | 13 | 8 | −8 | Y |
| | y | 2 | 8 | 13 | 7 | 0 | X |
| x | | 2 | 8 | 14 | 7 | −13 | Y |
| | Y | 2 | 7 | 14 | 7 | −6 | Y |
| | y | 2 | 7 | 14 | 6 | +1 | X |
| X | | 1 | 7 | 14 | 6 | −13 | Y |
| | Y | 1 | 6 | 14 | 6 | −7 | Y |
| | y | 1 | 6 | 14 | 5 | −1 | Y |
| | Y | 1 | 5 | 14 | 5 | +4 | X |
| x | | 1 | 5 | 15 | 5 | −10 | Y |
| | y | 1 | 5 | 15 | 4 | −5 | Y |
| | Y | 1 | 4 | 15 | 4 | −1 | Y |
| | y | 1 | 4 | 15 | 3 | +3 | X |
| X | | 0 | 4 | 15 | 3 | −12 | Y |
| | Y | 0 | 3 | 15 | 3 | −9 | Y |
| | y | 0 | 3 | 15 | 2 | −6 | Y |
| | Y | 0 | 2 | 15 | 2 | −4 | Y |
| | y | 0 | 2 | 15 | 1 | −2 | Y |
| | Y | 0 | 1 | 15 | 1 | −1 | Y |
| | y | 0 | 1 | 15 | 0 | 0 | Y |
| | Y | 0 | 0 | 15 | 0 | 0 | |

The present system utilizes the same input information and treats the information identically even though there are both simulated increments and actual increments as in my prior system.

In the above tabulation it will be noted that again each simulated X or Y step is denoted by a small letter while each actual increment is denoted by a capital letter. The system initially takes a simulated *X* increment from the start 27 which produces a negative sign in the error register, requiring the next increment to be a *Y* increment. It will be noted that after the first simulated *X* increment that the *i* count is increased by 1 while after the *Y* increment the *j* count is decreased by 1 with the error being determined by using the previous *i* and *j* count. The next two increments are an actual *Y* increment and an actual *X* increment with the *Y* increment decreasing the Y count by 1 and the *X* increment decreasing the X count by 1 with both the *i* and *j* counts remaining unchanged. Thus, for each increment whether simulated or actual, the value of *i* or *j* is subtracted from the error register while for only actual increments is the value of *i* or *j* decreased by 1. Accordingly, for each actual movement the value of the error is changed by either $2i\pm1$ or $2j\pm1$ as required.

By comparing the determination path of FIG. 3*c* with the increments determined in the above tabulation, it will be seen that the determination path corresponds with the sequence of tabulated increments. With respect to the actual path 33 shown in FIG. 3*b*, the increments are sequentially *Y, X, Y, X,* 3*Y, X* and 4*Y*.

Referring to FIG. 4 there is shown a block diagram of the system of the present invention. It includes an input block 51 which may be the output of a tape reader that reads the input information or commands from punched tape or may be a manual input in that the operator sets dials or switches which indicate the quantity for each of the input items. The information is then transferred into a storage unit 52 which includes a block 52*a* for containing, as indicated, the quantity of $\Delta X$ and its sign; a block 52*b* for containing the quantity of $\Delta Y$ and its sign; a block 52*c* for containing the quantity of *i* and its sign and a block 52*d* for containing the quantity of *j* and as its sign is determined by the signs of $\Delta X, \Delta Y$ and *i*, its sign is not stored. Each block may be a binary coded decimal unit with the signs being represented by the state of a flip-flop. Upon command the information stored in the storage unit 52 is transferred by a transferring unit 53 into subsequent appropriate blocks.

A block 54 is denoted $\Delta X$ REG with + or − sign and is essentially a down counter in that it can be set to the quantity of ΔX in the storage block 52a and then have its count reduced by one count for each change of energization applied to the X-axis motor 11. A block 55 denoted ΔY REG performs the same function as the block 54 for the ΔY axis and is of the same construction as the block 54. A block 56 is denoted i REG with + and − signs and is essentially an up-down counter in that it may count in either direction for each pulse it receives after being set to a particular quantity. The block 57 is denoted a j register and is also essentially an up-down counter.

A block 58 is denoted the "error" register with appropriate blocks for algebraic signs and is also an up-down counter that for each increment may change its count one unit or a number of units. A block 59 is denoted oscillator and is used to supply the pulses in the system when actuated at a set rate.

There is also shown a block 60 denoted X motor and a block 61 denoted Y motor. The X and Y motor blocks 60 and 61 are connected to a control unit block 62 by a pair of channels 60a and 61a, respectively. The X and Y motor blocks are identical and include not only the motors 11 and 12 but also a circuit for accepting an electrical pulse on a channel and causes a change of energization of the motor to produce one increment of movement. The pulses may be on either channel with pulses on one causing movement in one direction and pulses on the other causing movement in the reverse direction. The motors will move one increment for each pulse received. For a more complete description of its operation in accepting pulses and translating the same into a step, reference is made to U.S. Pat. No. 3,117,268, assigned to the assignee of the present invention.

The above-described apparatus is identical to the apparatus described in my above-noted copending application Ser. No. 718,725 with the exception that the control unit 62 is somewhat different as it corresponds to the flow chart shown herein in FIG. 5. Moreover, the control unit includes a k flip-flop 63 and an L flip-flop 64 which were not present in the previous system. Additionally, the oscillator 59 is operated preferably at twice the speed of the prior system to provide pulses in the system at a double rate while still being able to maintain the same speed of movement along the X and Y axes.

Figure 5:
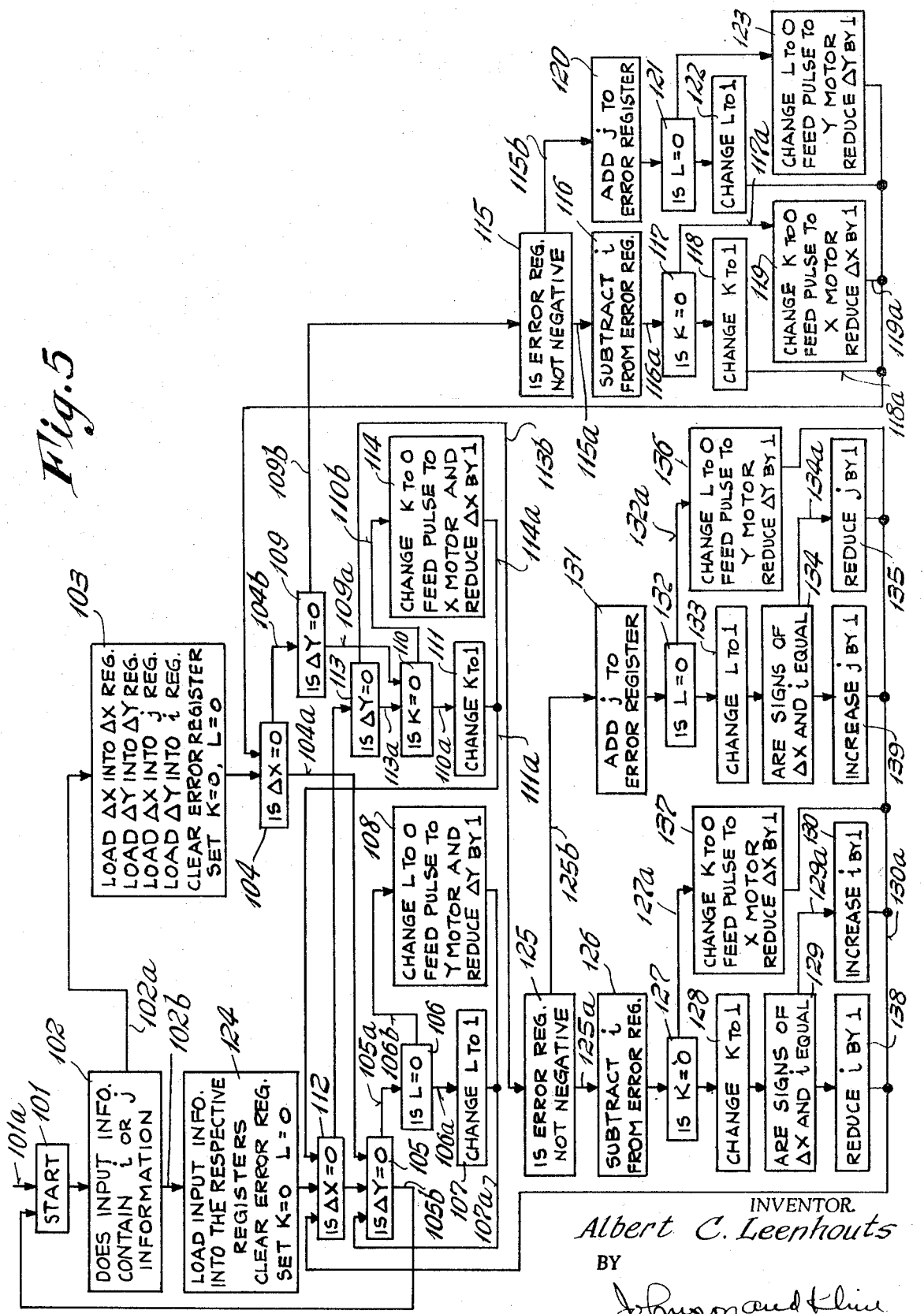
FIG. 5 is a sequence chart of the control circuit block utilized in the present system.

The sequence chart of the control unit of the present invention is shown in FIG. 5 and is a circuit that monitors the various conditions which may exist in the apparatus and utilizes the information to effect the operation of the motors. While the control unit may take any desired logic circuitry it is required that it function according to the conditions set forth in this chart. In this chart, there are many blocks and the blocks are indicated by their respective function for ease of explanation rather than by their structure. Moreover, it will be noted that if the block is a question and that if the answer is no then the information is passed horizontally while if the answer to the block's question is yes, the information is passed vertically in the direction of the arrows.

A start block 101 indicates to the control unit that a movement is to begin by a signal on a lead 101a which may be obtained from a manual start button or from tape or other source of input information and occurs after the input information has been accepted by the storage unit 52. The control unit then interrogates the registers by a block 102 to determine whether or not the movement is linear or arcuate by the former not containing either i or j in formation and the latter containing at least i or j information. If the information only has linear input information, i.e., only ΔX and/or ΔY quantities, a signal will appear on a lead 102a from the block 102 and the information is transferred to a block 103. Assuming that the command is to execute a linear path, this block 103 commands the transfer unit 53 to transfer the ΔX information in block 52a into both the ΔX register 54 and j register 57 and also the ΔY information 52b into both the ΔY register 55 and the i register 56. In addition, a signal is given to clear the error register so that it is set to 0 and that the k and L flip-flops 63 and 64 are set to the 0 state.

Upon this occuring, the registers are set to the quantity represented by the input information and a signal is passed to a block 104 which inquires whether or not the ΔX register is 0 which occurs only when there is to be no movement along the X-axis. Assuming this condition of ΔX=0, a signal is passed on a lead 104a to interrogating block 105 which inquires if the ΔY register is 0 to determine if there is to be a Y-axis movement. Assuming that ΔY is not 0, then the system will feed a pulse along a lead 105a to a block 106 which questions if the L flip-flop 64 is at its 0 state. As it initially has been set to its 0 state, then the first pulse will be fed through a lead 106a to a block 107 which causes that L flip-flop to be changed to its 1 state. The pulse then passes from the block 107 on a lead 107a to the input of block 105 so that the next pulse from the lead 104a will pass to the block 106 which as the L flip-flop has been changed to its 1 state directs the pulse onto a lead 106b to a block 108. This block effects changing the L flip-flop to the 0 state, feeds a pulse (a change of energization) to the Y motor 61 and reduces the ΔY register by 1. The first pulse accordingly was a simulated increment while the second pulse was an actual increment and effected movement of the bed 14.

After supplying of the pulse to the Y motor, a signal is produced on the lead 107a back to the block 105 which then inquires if the ΔY register has a zero count. If not, another pulse is supplied to the block 105 and to the block 106 to change the L flip-flop to its 1 state. The next pulse will then be passed to the block 108 to advance the Y-axis motor another step, reduce the ΔY register count by 1 and change the state of the L flip-flop. The system will continue supplying pulses to the block 105 until there is an indication from the ΔY register to the block 105 that the register has a zero count at which time a signal through a lead 105b will be supplied to the start block 101 to indicate termination of the movement.

On the other hand, for the situation where there is a linear movement just on the X-axis without any Y-axis movement, information is directed from the block 102 to the block 103 and thence to the block 104. A lead 104b conducts the pulse to a block 109 as the ΔX register does not have a zero count, which interrogates the ΔY register and finds that it has a zero count. A signal will then appear on a lead 109a to a block 110. Block 110 interrogates the K flip-flop if it is in the 0 state (as it is for the first increment), a pulse is passed along the lead 110a to a block 111 which changes the state of the K flip-flop to its 1 state. The signal is then passed on a lead 111a to a block 112 which interrogates the ΔX register to determine if it is 0. It is not as it is assumed to have a count. The signal is then directed on a line 112a to a block 113 which interrogates the ΔY register to determine if it has a zero count. As it is assumed to have a zero count, the pulse is passed on a lead 113a to the block 110. The K flip-flop is in the 1 state and thus the block 110 directs the pulse on a lead 110b to a block 114.

A pulse to the block 114 causes changing of the K flip-flop to the 0 state, the feeding of a pulse to the X motor 63 to cause an actual increment of movement and also the reduction of the count of the ΔX register by 1. After the operations in the block 114 have been performed, the information is led on the lead 114a to the lead 111a and thence to the block 112 where the next pulse will be processed. Thus, alternate pulses are caused just to change the state of the K flip-flop and constitute simulated increments while other pulses are actual increments and cause the motor to move one increment and the count of the ΔX register to be changed by 1. Upon the final pulse passing through the system for the movement when there is only a ΔX movement, the ΔX register and the ΔY register will then both have a zero count and this information will be passed over the lead 105b to the start block 101 in order to commence the effecting of the next path.

For the condition when there is both ΔX and ΔY information for a linear path, the information is passed through the block 104 to the block 109 and on a lead 109b to a block 115 which interrogates the error register 58 to determine if it is not negative. For the first pulse, the count of the error register will be 0 and hence the pulse will be passed on a lead 115a to a block 116 which causes the value of i to be subtracted from the error register. The information is then passed to a block 117 and then to either a block 118 or a block 119. The blocks 117, 118 and 119 correspond to the blocks 110, 111 and 114 which initially question the state of the K flip-flop and if it is 0 merely effects changing the state of the flip-flop. As this is the first pulse, it is in the 0 state and the information causes the K flip-flop to be changed to the 1 state and the information passed on a lead 118a to the block 104.

The next pulse is passed to the block 115 and assuming that the error register is still not negative the pulse will again effect a subtracting of i from the error register. As the K flip-flop is in the 1 state, the information is then passed over lead 117a to the block 119. The X motor 61 is then actuated to move an increment, the count of $\Delta X$ register is reduced by 1 and the state of the K flip-flop changed. This information is then passed over lead 119a to lead 118a and to the block 104 for enabling processing of the next pulse.

If the next pulse determines that the error register is negative then it passes on a lead 115b to a block 120 which causes j to be added to the error register. The pulse then passes into blocks 121, 122 and 123 which function in the same manner as blocks 106, 107 and 108, respectively, causing then to alternately process a simulated pulse which just changes the state of the 1 flip-flop or actuates the Y motor and reduces the count of $\Delta Y$ by 1. Pulses will continually flow to the block 115 until either the count of the $\Delta X$ register =0 or the count of the $\Delta Y$ register =0 at which time they will then be directed either through the lead 104a or the lead 109a until the count of both is zero when the movement is terminated and the commanded path completed.

For a desired path that is an arc, then the input information includes $\Delta X$, $\Delta Y$, i and j information. The block 102 will direct a signal over a lead 102b to a block 124 which causes the input information to be transferred into their respective registers, the error register cleared and the K and the L flip-flops set to a 0 state. As the information includes $\Delta X$ count and $\Delta Y$ count, the pulses are directed over lead 112a to the block 113 and over a lead 113b to a block 125. This latter block is similar to the block 115 and interrogates the error register to determine if it is not negative. Assuming that the input information is the same as that set forth for the arc shown in FIG. 3, the first pulse processed finds the error register at a 0 count and hence the information will be fed over line 125a to a block 126 which causes the value of i to be subtracted from the error register. The information is then passed to block 127, which as this is the first pulse, is in the 0 state and accordingly passes the information to a block 128 which causes the state of the K flip-flop to be changed to the 1 state.

A block 129 receives the pulse from the block 128 and questions the $\Delta X$ and i registers to determine if $\Delta X$ and i information have the same sign. In the specific example, they do not, so the information is passed over lead 129a to a block 130 which causes the count in the register i to be increased by 1. Thereafter the information is fed over lead 130a to the block 112 to effect processing of the next pulse. The error register is now negative and hence the pulse appears on a lead 125b to a block 131. The block 131 requires j to be added to the error register and passes the pulse on to a block 132 which interrogates if the L flip-flop is in the 0 state. As this is the first Y-axis pulse, it accordingly is, and the pulse then causes the state of the L flip-flop to be changed to a 1 state by a block 133 and the pulse is passed to a block 134 where the signs of the $\Delta X$ and i registers are interrogated to determine whether or not they are the same. As they are not, the information is fed on a lead 134a to a block 135 which causes the count of the j register to be reduced by one and thereafter over lead 130a to the block 112 to enable the next pulse to be processed.

The next pulse arrives at the block 125, finds that it is negative and accordingly is directed through the block 131 to the block 132. However, as the L flip-flop is in the 1 state the pulse is then directed to a block 136 over a lead 132a to cause the state of the L flip-flop to be changed to the 0 state, a pulse or change of energization to be directed to the Y motor 61 and the count of the $\Delta Y$ register be reduced by 1. The termination information is again fed over lead 130a to the block 112.

The next pulse in this specific path is an actual increment of movement on the X axis and accordingly, the error register is now positive, directing the pulse to the block 127 where the K flip-flop is not in the 0 state and hence the information is fed on a lead 127a to a block 137. This block causes the state of the K flip-flop to change to the 0 state, the X motor 60 moved one increment and the count of the $\Delta X$ register to be reduced by 1. A termination pulse is then passed on the lead 130a to the block 112.

The pulses will be continually applied to the block 112 until the $\Delta X$ register attains a zero count when they will then be directed to the block 105 to cause alternate simulated increments and actual increments to occur on the Y-axis until the count of the $\Delta Y$ register becomes 0. This completes the path and information will then be fed over lead 105b to the start block 101.

The only other blocks in the sequence chart of FIG. 5 that have not been heretofore referred to are blocks 138 and 139. These blocks become effective only when the signs of the $\Delta X$ and i register are the same. The block 138 serves to cause the count of the i register to be reduced by a count of 1 rather than to be increased by 1 as directed by the block 130. As to the block 139, this block causes the count of the j register to be increased by a count of 1 when the signs of the $\Delta X$ and i registers are equal rather than be decreased by 1 when they are unequal by the block 135.

The logic circuit of the control unit may take any desired structural configuration including AND, NOR, OR, etc., gates that a man skilled in the art may construct. The various registers are essentially binary counters but they also take any particular form found desirable or convenient.

It will be noted that in an arcuate path for each actual movement, a value of $2i\pm1$ or $2j\pm1$ must be added to the error register. As only the value of i is stored, it accordingly had required that the changing value of i be doubled in order to be useful. However, in the present system, the use of alternate simulated and actual increments enables the value of i or j to be subtracted for each increment without requiring that its value be doubled or otherwise modified.

My above-noted copending application describes the manner of supplying input information for other linear and arcuate paths and reference is made thereto as the same manner is usable with the present system.

It will accordingly be appreciated that there has been disclosed a method and apparatus for causing an element to automatically traverse a desired path either linear or arcuate. The actual path traversed, however, only substantially approximates the desired path as it consists of a plurality of discrete increments of movements on a pair of perpendicular axis. The increments occur sequentially and a determination is made on which axis the next increment is to occur by considering the present position of the element with the desired path. Also there are simulated increments for which a determination of the axis is made. Both simulated and actual increments are directed to their determined axis but at the axis they alternate with the simulated increments producing no movement while the actual increments produce movement. In this manner, the numerical control contour system of the present invention makes the actual path more closely correspond to the desired path and decreases the maximum possible deviation therebetween to much less than the length of an increment of movement.

Variations and modifications may be made within the scope of the claims and portions of the improvements may be used without others.

I claim:

1. The method relatively moving an element along an actual path that substantially coincides with a desired path with all movement occurring as increments of movement on either one axis or another axis perpendicular to the one axis comprising the steps of taking a plurality of simulated increments of movement and actual increments of movement with each increment being taken sequentially, determining if the last increment could have caused a crossing of the path by the element if the element was so moved for each increment with the determination selecting on which axis the next increment is to occur, directing each increment to the axis so determined and inhibiting each simulated increment from moving the element while causing each actual increment to effect movement of the element whereby more determinations are made than actual movements occur.

2. The invention as defined in claim 1 in which each axis receives the simulated increments and the actual increments and in which the step of inhibiting includes inhibiting only alternate received increments on each axis whereby every alternate increment received by an axis is an actual increment which effects movement of the tool along the actual path.

3. The invention as defined in claim 2 in which the step of inhibiting each odd numbered pulse received by an axis.

4. The invention as defined in claim 1 in which an actual increment of movement on one axis causes a known deviation of the element from the desired path and in which the step of determination for each step includes determining the total deviation produced by both simulated and actual movements.

5. The invention as defined in claim 4 in which the desired path is linear and in which the step of determining uses the same quantity of deviation for both simulated and actual steps on the same axis.

6. The invention as defined in claim 4 in which the desired path is arcuate and in which the step of determining includes the step of using the same deviation for sequentially occurring simulated and actual increments of movement of the same axis and for changing the deviation by a count of 1 for only each simulated movement.

7. The invention as defined in claim 1 in which the step of determination includes the steps of maintaining an algebraic count of the deviation between the actual path and the desired path, in which a change in sign of the deviation after an increment on one axis indicates a crossing of the desired path and in which the next increment is directed to the other axis irrespective of whether it is a simulated increment or an actual increment.

8. A numerically controlled contour system for producing movement of an element substantially along a desired path by sequential increments of movement on a first and a second axis perpendicular to each other comprising a first stepping motor means connected to the element for moving said element an increment of movement for each change of energization received by said motor means on the first axis, a second stepping motor means connected to the element for moving said element an increment of movement for each change of energization received by said second motor means on the second axis, means for receiving information of the desired path, means for producing simulated increments of movement and actual increments of movement, means for determining after each increment the deviation that would be produced by a determination path containing both increments of movement and directing the next increment to the axis which would effect a crossing of the desired path by the determination path and means connected to each stepping motor means for permitting only actual increments of movement on each axis to effect a change of energization to produce a movement of the element.

9. The invention as defined in claim 8 in which the permitting means for each axis includes a two-state means, in which the two-state means is connected to alter its state for every increment received by its axis and in which only the increments of movement that occur while the two-state means is in one of its states constitutes an actual movement.

10. The invention as defined in claim 8 in which an increment of movement of the element on an axis produces a known deviation of the actual path from the desired path, in which the determining means includes an error register for maintaining the algebraic sum of the deviations after each simulated and actual increment and in which the known quantity added to the error register is the same for either a simulated increment or an actual increment.

11. The invention as defined in claim 10 in which the desired path is linear and there are means for maintaining the known quantity to be added to the error register constant.

12. The invention as defined in claim 10 in which the desired path is arcuate, in which there are means for varying the known quantity after each increment of movement of the element and in which each simulated increment and each actual increment causes the known quantity to be added to the error register.